(12) United States Patent
Kushner et al.

(10) Patent No.: US 7,478,026 B1
(45) Date of Patent: Jan. 13, 2009

(54) APPLICATION PROGRAMMING INTERFACE SIMULATOR FOR A DATA STORAGE SYSTEM

(75) Inventors: Peter Yale Kushner, Fiskdale, MA (US); Jonathan I. Krasner, North Attleboro, MA (US); Kenneth Vineleaf, Leominster, MA (US); Philip E. Tamer, Westboro, MA (US); James H. Torrey, Grafton, MA (US); Daryl Kinney, Hopkinton, MA (US); John D. Sullivan, Wrentham, MA (US)

(73) Assignee: EMC Corporation, Hopkinton, MA (US)

( * ) Notice: Subject to any disclaimer, the term of this patent is extended or adjusted under 35 U.S.C. 154(b) by 352 days.

(21) Appl. No.: 11/001,448

(22) Filed: Dec. 1, 2004

(51) Int. Cl.
*G06F 17/50* (2006.01)
*G06F 15/177* (2006.01)

(52) U.S. Cl. .......................... 703/13; 709/220
(58) Field of Classification Search ............... 703/13–14
See application file for complete search history.

(56) References Cited

U.S. PATENT DOCUMENTS

| | | | |
|---|---|---|---|
| 5,206,939 A | | 4/1993 | Yanai et al. |
| 5,325,505 A | * | 6/1994 | Hoffecker et al. ........... 707/101 |
| 5,544,347 A | | 8/1996 | Yanai et al. |
| 5,742,792 A | | 4/1998 | Yanai et al. |
| 5,778,394 A | | 7/1998 | Galtzur et al. |
| 5,845,147 A | | 12/1998 | Vishlitzky et al. |
| 5,857,208 A | | 1/1999 | Ofek |
| 5,890,014 A | * | 3/1999 | Long .............................. 710/8 |
| 6,073,209 A | * | 6/2000 | Bergsten ..................... 711/114 |
| 6,339,803 B1 | * | 1/2002 | Glassen et al. ................ 710/52 |
| 6,378,013 B1 | * | 4/2002 | Hanson ....................... 710/100 |
| 6,636,940 B1 | * | 10/2003 | Hodges ....................... 711/112 |
| 7,028,138 B2 | * | 4/2006 | Ali et al. ...................... 711/114 |
| 7,124,324 B1 | * | 10/2006 | Au ................................ 714/29 |
| 2003/0028521 A1 | * | 2/2003 | Teloh et al. .................... 707/3 |
| 2006/0095547 A1 | * | 5/2006 | Cohn ........................... 709/220 |

OTHER PUBLICATIONS

Hennessy et al. 2003, Morgan Kaufmann Publishers., Computer Architecture, AQuantitative Approach, Third Edition, p. 413-415.*

* cited by examiner

*Primary Examiner*—Paul L Rodriguez
*Assistant Examiner*—Eunhee Kim
(74) *Attorney, Agent, or Firm*—Muirhead and Saturnelli, LLC

(57) ABSTRACT

Described are techniques for simulation of a data storage system configuration. The simulation state reflects the data storage system configuration in accordance with an application programming interface (API) model. API calls result in reading existing data storage system configuration data and/or modifying the configuration data by execution of one or more low level calls. A daemon may operate in a simulation mode in which the low level calls are simulated rather than resulting in communications with a data storage system when operating in a non-simulation mode. A low level cache is used to store simulated values returned from the data storage system microcode. A high level cache is used to store API call return data. A seed file is used to initialize the simulation state.

34 Claims, 12 Drawing Sheets

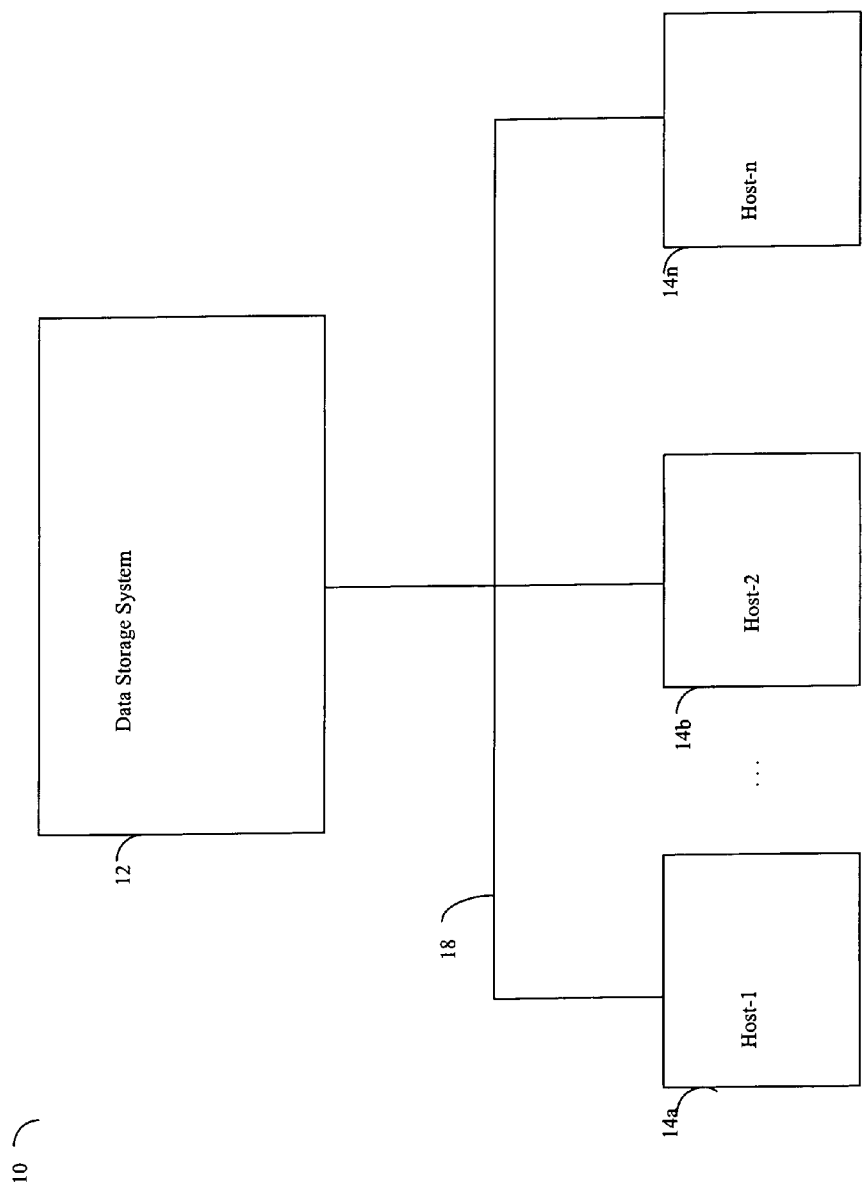

APPLICATION PROGRAMMING INTERFACE SIMULATOR FOR A DATA STORAGE SYSTEM

BACKGROUND

1. Technical Field

This application generally relates to simulation, and more particularly to techniques for simulation in connection with data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845, 147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

An application program may be developed for execution on a host system to issue different commands to the data storage system. The application program may require testing on a host system using a particular version of host system software, such as, for example, a particular operating system version or other host software. In order to test the application program, data storage system hardware and software may also be required. The application program may require further testing with different data storage system hardware and/or software versions.

Thus, it may be desirable to provide a technique that may be used in software development, training, and/or testing which does not require an actual data storage system. The technique may provide for simulation of the different versions of data storage system software and/or hardware.

SUMMARY OF THE INVENTION

In accordance with one aspect of the invention is a method for simulating a configuration of a data storage system comprising: determining first configuration data representing an initial data storage system configuration state; and simulating a configuration call by using said first configuration data in accordance with a type of said configuration call, said type being active if said configuration call results in modifying a portion of said first configuration data, said type being passive if said configuration call results in returning data associated with a portion of said first configuration data without modification to said first configuration data. The type of said configuration call may be a hybrid if said configuration call results in both modifying a portion of said first configuration data and returning data associated with a portion of said first configuration data. The first configuration data may include data describing a topology of said data storage system. The first configuration data may include data describing data storage devices, connections between said data storage devices, connections between data storage devices and host systems. The method may also include determining said first configuration data in accordance with a simulation initialization input. The simulation initialization input may include a file with output produced by one or more application programming interface calls returning data storage system configuration state information. The simulation initialization input may include at least one value specifying a simulation condition included in an options file. The method may also include modifying said first configuration data using a command line interface. The first configuration data may be included in a cache, and the method may further comprise: storing contents of said cache to a dump file; and using said dump file in initializing a simulation. The method may also include initializing a cache in accordance with said simulation initialization input. The configuration call may be a high level call resulting in one or more low level calls, said one or more low level calls resulting in communications with a data storage system when executing in non-simulation mode, and otherwise resulting in simulated low level calls during simulation. During said simulation, said low level calls may use data included in a low level cache, said data in said low level cache corresponding to data returned by microcode execution on the data storage system for each low level call, said first configuration data including said data in said low level cache. A portion of said data in said low level cache may be modified in accordance with said type if said configuration call is active, and, if said configuration call is passive, data associated with a portion of said data in said low level cache may be returned. A high level cache may be used to cache data returned for passive configuration calls, said high level cache including an entry for at least one passive configuration call associated with a portion of data returned from at least one low level call. The high level cache may be used independent of whether a simulation is in progress. The first configuration data may not reflect a state of user data stored on devices within the data storage system in accordance with commands that modify the user data stored on the devices. An executable program may perform said one or more application programming interface calls.

In accordance with another aspect of the invention is a computer program product that simulates a configuration of a data storage system comprising code that: determines first configuration data representing an initial data storage system configuration state; and simulates a configuration call by using said first configuration data in accordance with a type of said configuration call, said type being active if said configuration call results in modifying a portion of said first configuration data, said type being passive if said configuration call results in returning data associated with a portion of said first configuration data without modification to said first configuration data. The said type of said configuration call may be hybrid if said configuration call results in both modifying a portion of said first configuration data and returning data associated with a portion of said first configuration data. The first configuration data may include data describing a topology of said data storage system. The first configuration data includes data that may describe data storage devices, connections between said data storage devices, connections between data storage devices and host systems. The computer program product may also include code that determines said first configuration data in accordance with a simulation initialization input. The simulation initialization input may include a file with output produced by one or more application programming interface calls returning data storage system configuration state information. The simulation initialization input may include at least one value specifying a simulation condition included in an options file. The computer program product may also include code that: modifies said first configuration data using a command line interface. The first configuration data may be included in a cache, and the computer program product may further comprise code that: stores contents of said cache to a dump file; and uses said dump file in initializing a simulation. The computer program product may also include code that initializes a cache in accordance with said simulation initialization input. The configuration call may be a high level call resulting in one or more low level calls, said one or more low level calls resulting in communications with a data storage system when executing in non-simulation mode, and otherwise resulting in simulated low level calls during simulation. During said simulation, said low level calls may use data included in a low level cache, said data in said low level cache corresponding to data returned by microcode execution on the data storage system for each low level call, said first configuration data including said data in said low level cache. A portion of said data in said low level cache may be modified in accordance with said type if said configuration call is active, and data may be returned which is associated with a portion of said data in said low level cache if said configuration call is passive. A high level cache may be used to cache data returned for passive configuration calls, said high level cache including an entry for at least one passive configuration call associated with a portion of data returned from at least one low level call. The high level cache may be used independent of whether a simulation is in progress. The first configuration data may not reflect a state of user data stored on devices within the data storage system in accordance with commands that modify the user data stored on the devices. An executable program may perform said one or more application programming interface calls.

BRIEF DESCRIPTION OF THE DRAWINGS

Features and advantages of the present invention will become more apparent from the following detailed description of exemplary embodiments thereof taken in conjunction with the accompanying drawings in which:

FIG. 1 is an example of an embodiment of a computer system according to the present invention;

DETAILED DESCRIPTION OF EMBODIMENT(S)

Figure 2A:
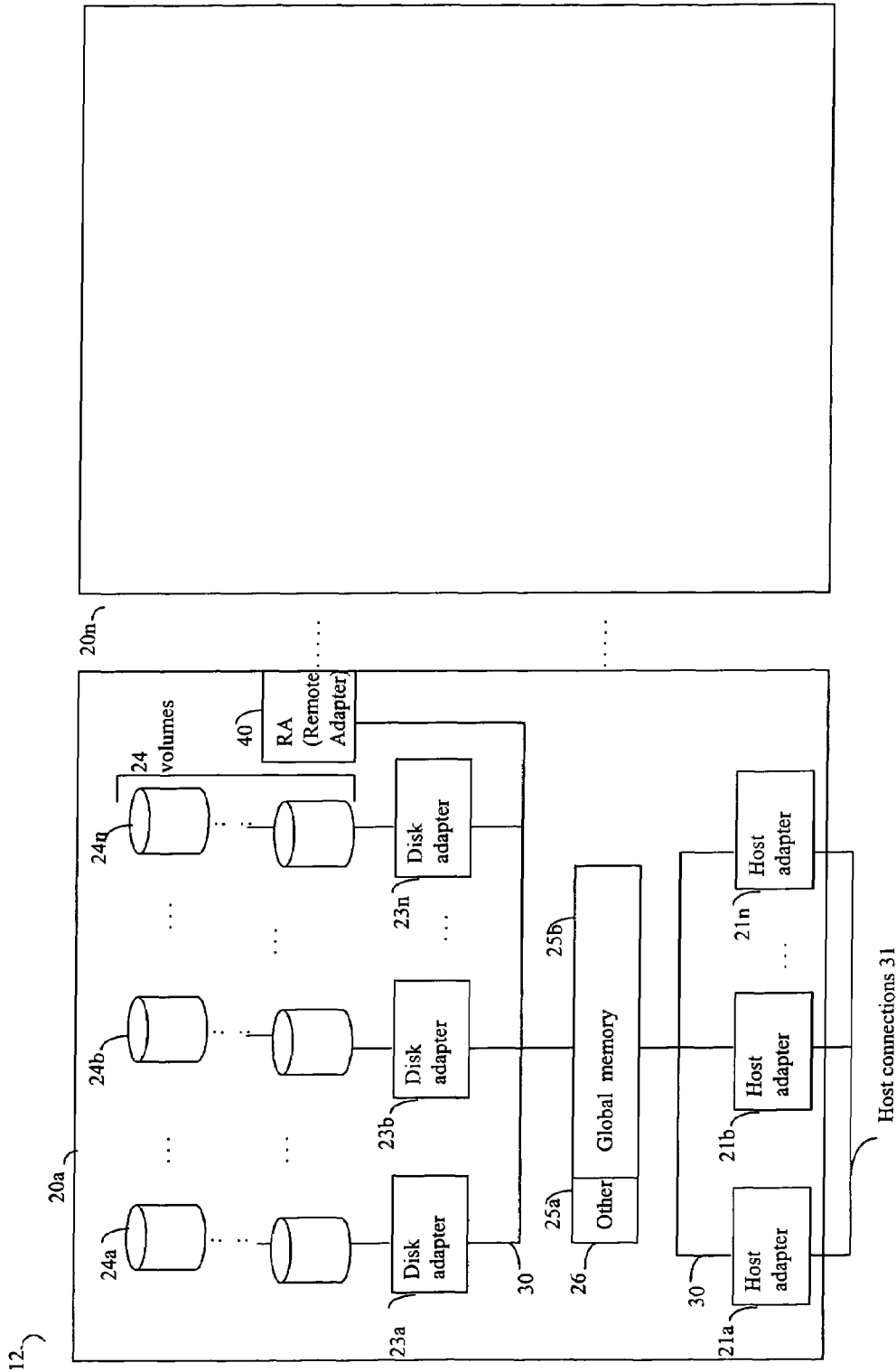
FIG. 2A is an example of an embodiment of a data storage system.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
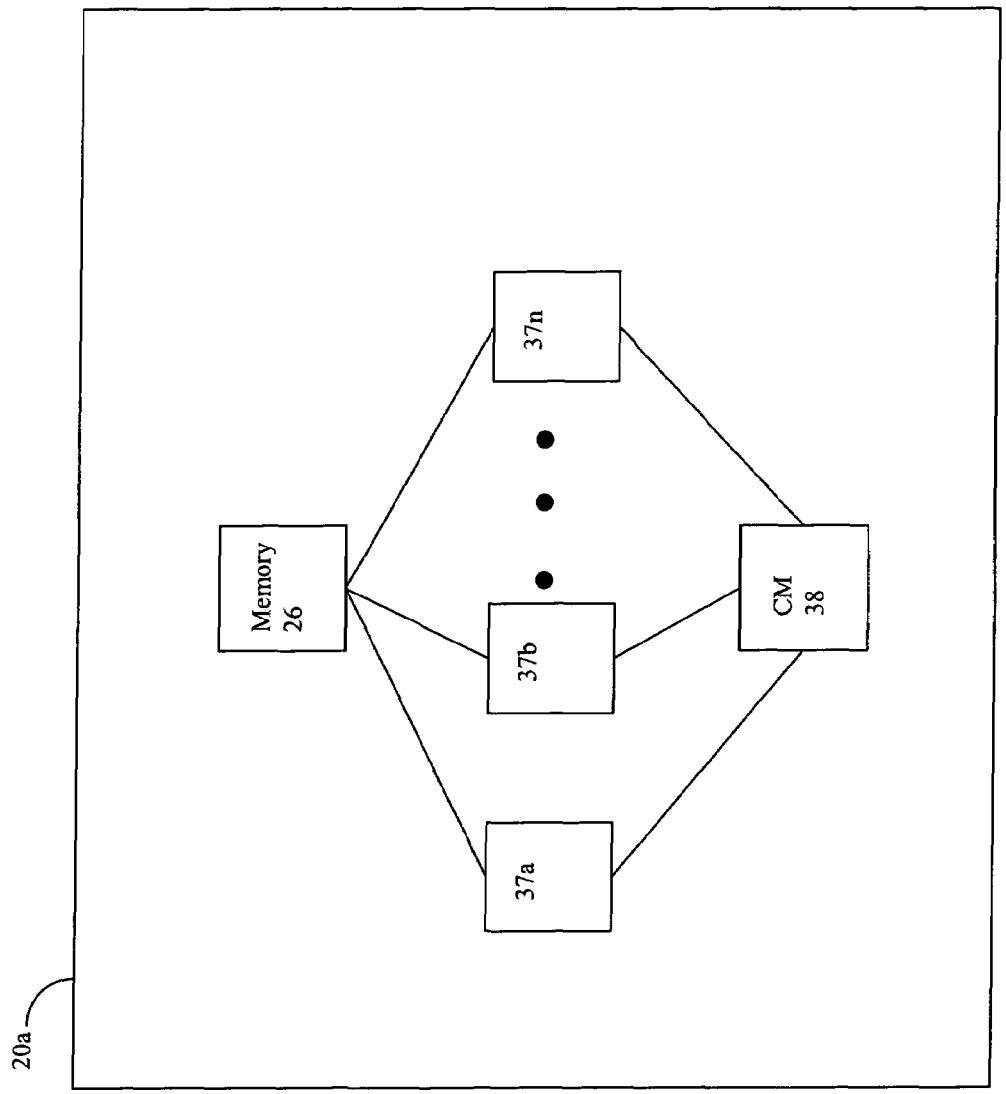
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
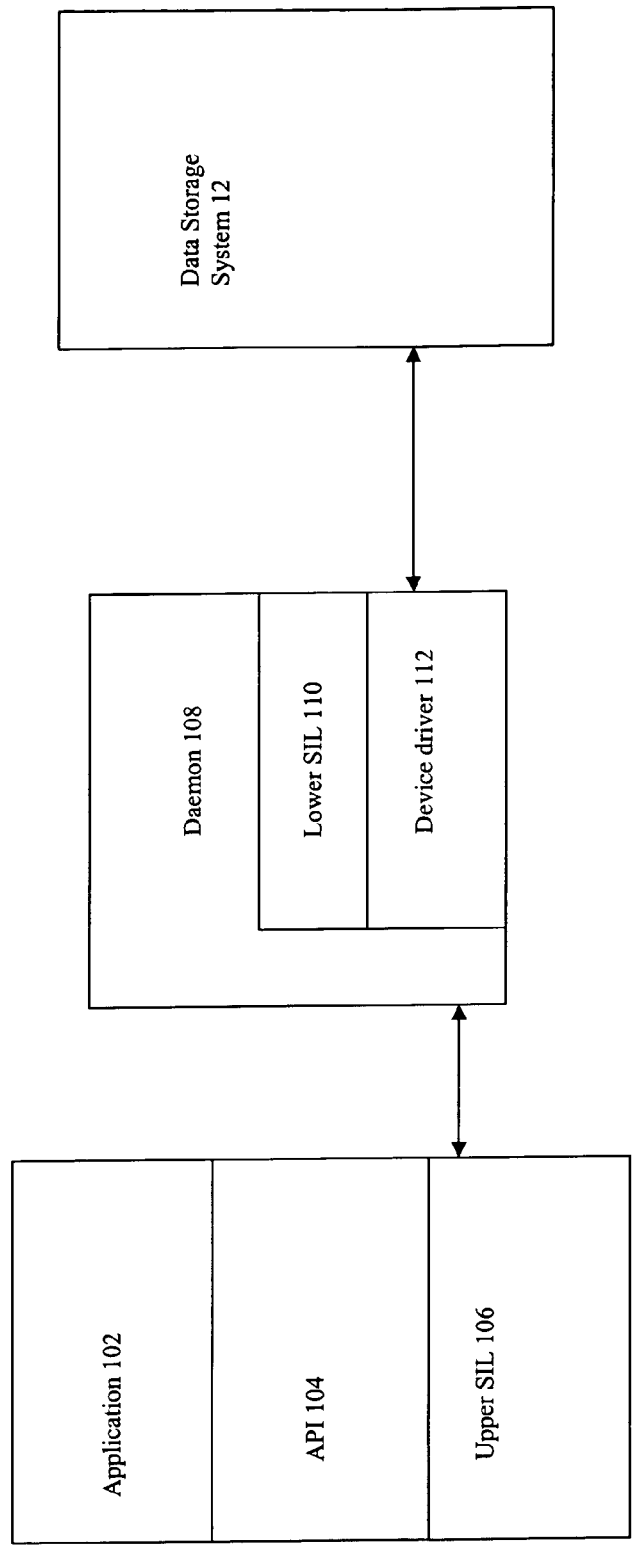
FIG. 3 is an example of an embodiment of components and software layers that may be included the system of FIG. 1 for non-simulation mode.

Referring now to FIG. 3, shown is an example of an embodiment 100 of components and various software layers that may be included in an embodiment of the system 10 of FIG. 1. Included in the example 100 is an application 102, an Application Programming Interface (API) 104, and an Upper Storage Interface Layer (SIL) 106. Also shown in the example 100 is a daemon 108 which further includes a Lower SIL 110 and device driver 112.

The application 102 may be a program written using one or more software programming languages known to those of ordinary skill in the art. The application 102 may be executable code produced using various tools such as a linker, loader and the like. The application 102 may be executed on one of the host systems, such as the host 14a of FIG. 1. The application 102 may use the API 104 to issue various commands to the data storage system 12. In one embodiment, the application may use the API to perform API calls. The API calls may result in execution of microcode on the data storage system 12 causing operations to be performed in accordance with the particular API. The API may include API calls for performing I/O operations, such as read and write operations. The API may also include configuration calls used in connection with the configuration and state of the data storage system. The configuration API calls used in connection with the data storage system may include functionality, for example, to monitor, inquire about, and/or modify the configuration and state of the data storage system such as may be used in connection with data storage system management. The configuration API calls may result in executing one or more low level passive calls and/or low level active calls. The low level active and passive calls may be made to a lower software layer within the daemon 108, such as the lower SIL layer 110 described in more detail elsewhere herein. Data storage system configuration API calls may also be characterized as active or passive. An active API call may be characterized as an API call resulting in only one or more low level active calls for data storage system configuration. A passive API call is an API call resulting in only one or more low level passive calls for data storage system configuration. An API may be characterized as a hybrid, if, for example, both passive and active low level calls result. Both active and passive calls are described in more detail in following paragraphs.

The API 104 may interface with an Upper SIL 106 representing a first or higher level of abstraction of the interface between the API 104 and the daemon 108. The Upper SIL 106 may be used in connection with facilitating communication between the API 104 and daemon 108. The Upper SIL 106 and daemon 108 may communicate using any one of a variety of different interprocess communication techniques. For example, in one embodiment, TCP/IP may be used to facilitate communications between components. It should be noted that the application 102 as well as the API 104 and Upper SIL 106 may be executed on a host system such as 14a. In an alternate embodiment, components 106 and 108 may be executing on the same system and components 102 and 104 on another different system. The daemon 108 may be characterized as a process used in facilitating communications between an application 102 and a data storage system 12. The daemon 108 may also be executing on the same host system as the application 102 and its associated components. In one embodiment, the daemon 108 may function in one of two different modes. In a first mode, daemon 108 communicates with a Lower SIL 110 which facilitates communication with a device driver 112. The device driver 112 may be used, for example, in issuing various commands, such as SCSI commands, to communicate with devices within the data storage system 12. The application 102 may issue an API call using the API 104 which is communicated to the daemon 108 via the Upper SIL 106. In connection with an API call, the daemon 108 may issue one or more commands in the form of low level calls to the device driver 112 via the Lower SIL 110.

The Lower SIL 110 serves as an abstraction layer to facilitate communications between the daemon 108 and a lower level routine, such as may be included in the device driver 112. The device driver 112 may then communicate directly with the data storage system 12 to carry out one or more lower level operations to perform a request such as may be communicated in the form of an API call issued by the application 102.

As will be described in more detail in following paragraphs, the passive API and low level calls may be used to obtain information reflecting a current state or configuration of the data storage system 12. In one embodiment, passive API and low level calls cause the microcode on the data storage system to read or retrieve information about the existing state or configuration of the data storage system. Such passive calls may be used, for example, to perform an inquiry of the data storage system regarding available devices, device attributes, device connections or groupings, and the like. Information may include, for example, configuration data about the current state of the data storage system, data about the status of one or more devices, connections, and the like. In contrast to the passive calls, active API and low level calls may be characterized as calls which modify the current state or configuration of the data storage system. An active API or low level call results, for example, in a modification of the information normally returned by one or more passive calls. An active call may, for example, be used to establish or define RDF (Remote Data Facility) pairings. Data storage device communication between Symmetrix™ data storage systems using RDF is described, for example, in U.S. Pat. Nos. 5,742,792 and 5,544,347, both of which are incorporated by reference herein. A passive call may, for example, read information from global memory or another location on the data storage system regarding the currently defined RDF pairings. The particular APIs and low level passive and active calls included in an embodiment may vary in accordance with the functionality and features provided by the API and data storage system microcode.

In an embodiment described herein, the first mode may be characterized as a "normal" or non-simulator mode of operation. The daemon 108 may also operate in accordance with a second mode in which the daemon functions as a simulator. In one embodiment, the daemon 108 may be configured to run either in the first mode to perform communications with the data storage system as shown in FIG. 3, or in the second mode as illustrated in connection with FIG. 4 (described below) where the daemon 108 functions as a simulator. Techniques for configuring the daemon and other components are described elsewhere herein.

Figure 4:
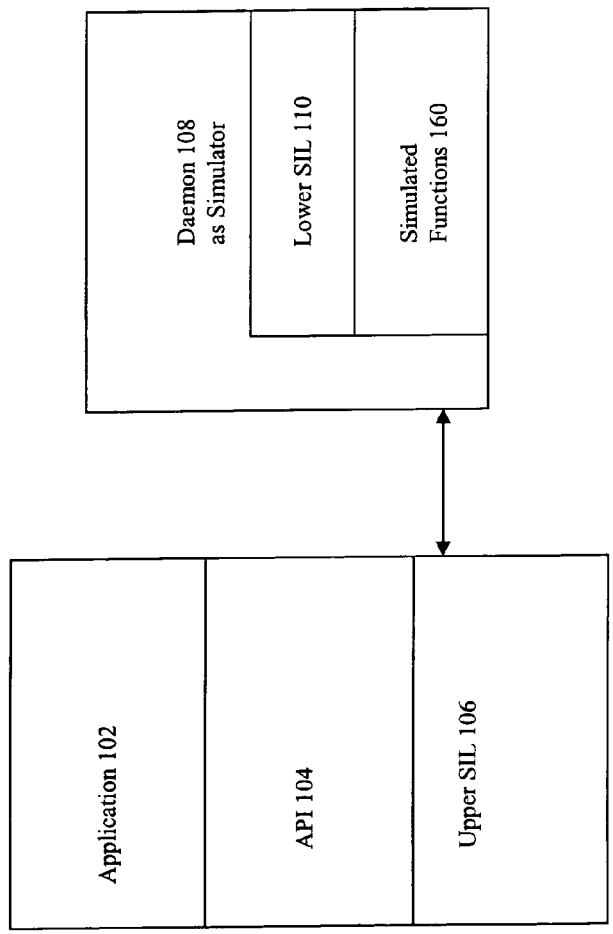
FIG. 4 is an example of an embodiment of components and software layers that may be included the system of FIG. 1 for simulation mode.

Referring now to FIG. 4, shown is an example 150 of components and software layers that may be included in an embodiment of the system 10 of FIG. 1 when the daemon is configured to execute in simulation mode. Included in 150 is the application 102, the API 104 and the Upper SIL 106 as described in connection with FIG. 3. The Upper SIL 106 communicates with the daemon 108 as also described previously in connection with FIG. 3. However, in this example, the daemon 108 functions in a second mode as a simulator in which the Lower SIL 110 communicates with simulated functions 160. The simulated functions 160 of FIG. 4 may be used rather than the device driver 112 which communicates with the data storage system 12.

It should be noted that in the example 150, no data storage system hardware or software executing on a data storage system is included. Within the example 150, the simulated functions 160 may be used in connection with simulating one or more aspects of the data storage system 12. An embodiment may simulate the data storage system configuration API calls alone, or in addition to, simulating the data state within the data storage systems, such as in connection with I/O requests.

In connection with FIGS. 3 and 4, different software levels or layers are shown as an example for purposes of illustration of the techniques described herein. Other embodiments may include other layers and components than as illustrated in connection with FIGS. 3 and 4.

What will now be described are techniques that may be used in connection with simulating data storage system configuration API calls. The techniques may be used to simulate API calls for different hardware and/or software configurations of a data storage system without actually having a data storage system present. For example, the simulation techniques described herein may be used in connection with testing an application 102 residing on a host system without requiring the use of actual data storage system hardware and/or software. Thus, the techniques described herein may be used in testing one or more versions of the application 102, and data storage system functionality used therein, by changing or modifying the version of the simulated functions 160.

The techniques described in following paragraphs for simulation of data storage system configuration API calls do not simulate the internals or actual state of data on a device within the data storage system, but rather simulate the configuration and associated configuration state of the data storage system. In one embodiment, the daemon 108 functioning as a simulator may intercept low level calls made at the Lower SIL level 110 such that these intercepted calls are simulated rather than being forwarded to a lower level device driver which communicates with the data storage system.

Figure 4A:
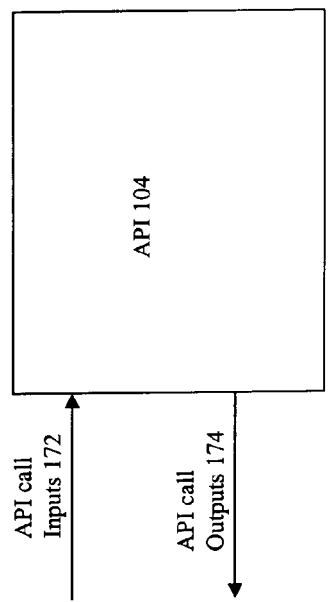
FIG. 4A is an example representation illustrating the simulation of the data storage system configuration API calls.

Referring now to FIG. 4A, shown is an example representation illustrating the simulation of the data storage system configuration API calls. In the representation 170, the API 104 is treated as a "black box" simulating the API call outputs 174 in accordance with the particular API and API call inputs 172. The simulation maintains configuration state information of the data storage system. The passive API calls and hybrid API calls retrieve data from the configuration state information which is in the form of API call outputs 174. The active API calls and hybrid API calls result in a modification to the configuration state information maintained in the simulation. The modification is communicated to the API in the form of API call inputs 172. It is the behavior illustrated in FIG. 4A that is simulated in connection with the simulation of data storage system configuration API calls.

Figure 5:
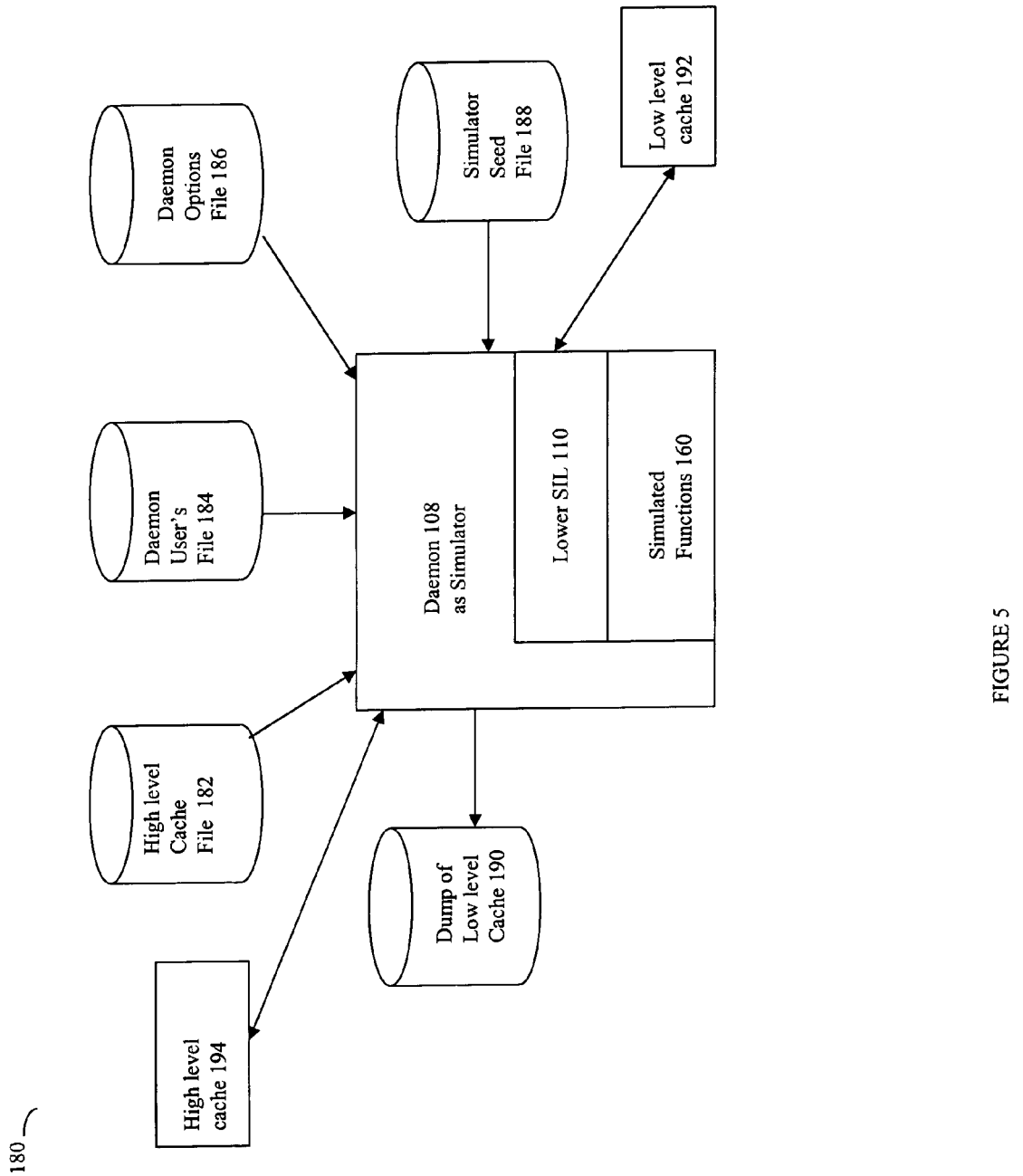
FIG. 5 is an illustration of the data files and caches that may be used in connection with an embodiment of the simulator.

Referring now to FIG. 5, shown is an illustration of the data files and caches that may be used in connection with an embodiment of the daemon 108 functioning in the second mode as a simulator. It should be noted that other embodiments may use other input and output files than as illustrated in connection with FIG. 5. In one embodiment, the daemon 108 when being used for simulation purposes may use one or more different files for simulator configuration at start up of the daemon 108. The daemon 108 may input a high level cache file 182, a daemon user's file 184, a daemon options file 186, and a simulator seed file 188. Each of these files will be described in more detail in following paragraphs. Additionally, also described in following paragraphs is an output file, the dump of the low level cache 190, that may be produced optionally by an embodiment of the daemon 108.

The illustration 180 also includes a low level cache 192 and a high level cache 194. The low level cache 192 may be used to cache data returned to the lower SIL component 110 from each of the low level simulated function calls 160. A single API call may result in one or more low level function calls made by the lower SIL component 110 to the simulated functions 160. Data cached in the high level cache 194 corresponds to data returned for each data storage configuration system API call. In one embodiment, the daemon 108 functioning as a simulator may package or gather data returned from one or more low level simulated function calls. The gathered data may be returned by the daemon 108 to the Upper SIL 106 of FIG. 4. The daemon may cache the gathered data in the high level cache 194 prior to returning the gathered data to the Upper SIL 106 of FIG. 4.

An embodiment may use any one of a variety of different techniques and policies known to those of ordinary skill in the art in connection with management and operation of the high level cache 194 and low level cache 192. In one embodiment, data from the high level cache 194 may be returned for successive invocations of a same API. If there is no data included in the high level cache 194 for a corresponding API call, data returned from one or more low level simulated function calls is gathered and stored in the high level cache 194. Data in the high level cache 194 may depend on return data from one or more low level simulated function calls. The low level cache 192 includes data returned in response to invoking a low level passive call. An embodiment may invalidate data included in the high level cache if there is a modification to the return data from any one or more of the dependent low level simulated function calls. Such a modification may occur, for example, as a result of a low level active call causing a change to the data storage configuration state. For low level active calls, data may be retrieved from the low level cache, modified, and then restored to the low level cache. In one embodiment, a modification to the low level cache data causes invalidation of dependent data in the high level cache which references the modified low level cache data. An embodiment may use any one of a variety of different cache invalidation techniques to appropriately invalidate high level cache entries in accordance with a low level active call. Details regarding the operation and management of the high and low level caches that may be used in an embodiment is described in following paragraphs.

A simulator seed file 188 may be used to specify initial simulation conditions and may be read by the daemon 108 functioning in simulation mode on startup. The simulator seed file 188 may be characterized as a snapshot of an initial data storage system state. In one embodiment, the simulator seed file 188 may come from one of two different sources. The simulator seed file 188 may be a debug log file or, alternatively, a previous dump of the low level cache. The simulator seed file 188 may be created prior to execution of the daemon functioning in simulation mode. The simulator seed file 188 includes the output produced by every low level passive call for functionality being simulated in an embodiment. In one embodiment, the debug log file may be created by executing a program which issues API calls prior to simulation to collect all the data returned from the low level passive calls into the debug log file. By including all the return data for all low level passive calls in the debug log file, the debug log file includes all of the information regarding the initial configuration of the data storage system as may be returned in connection with a discovery API call. The discovery API call may perform a discovery process, for example, to discover the configuration and setup of the data storage system. The discovery process may perform multiple lower level passive system calls to determine local devices, remote devices, device attributes, connections, devices associated in defined groupings, such as for RDF groups, and the like, about the data storage system.

A second method for seeding the simulator may be achieved using a binary file created from a previous dump 190 of the low level cache. In other words, the simulator may be seeded utilizing a snapshot of a previous simulation as recorded in the low level cache. The binary file may be created in several different ways. In one embodiment, the daemon options file 186 may have an option enabled causing the simulator to dump the contents of the low level cache 192 to a binary file, the dump of the low level cache 190, when the simulation ends without error. In this instance, the daemon options file 186 may also specify the name of the file 190 along with other daemon options. A user may also issue a command to the daemon 108 to dump the contents of the low level cache 192 to the file 190 at a point in time during a simulation. In other words, while the daemon 108 is actually executing as a simulator, a command may be issued to the daemon 108 using, for example, a command interface that may be included in an embodiment to force the daemon to produce an output or a dump of the low level cache into file 190 at a point in time during a simulation. It should be noted that the high level cache as described in more detail elsewhere herein may also exist in an embodiment when executing in either the first mode (normal, non-simulation) or second mode (simulation). An embodiment may also include functionality so that the low level cache 192 may be dumped into 190 when operating in the first mode, and the dump file of the low level cache 190 may be used to seed a subsequent simulation.

The high level cache file 182 may be used to specify options which control the performance of the caching techniques and policies for the high level cache 194. Such options may include, for example, how long various data should be maintained within the high level cache prior to being flushed from the cache, what particular data should/should not be cached, and the like.

The daemon user's file 184 may be used to grant and control user access to various daemons. It should be noted that an embodiment may allow multiple instances of a daemon 108 functioning as the simulator. The daemon user's configuration file 184 may be a mechanism by which access is granted to particular users in connection with particular instances of a daemon 108 executing as a simulator.

The daemon options file 186 may specify different options controlling execution of the daemon 108 functioning as a simulator. In the daemon options file 186, for example, the seed file name may be specified, or a default name may be used. Other options that may be specified in the daemon options file 186 include, for example, the simulation rate for different active API calls, whether to enable or disable the dumping of the low level cache 192 to a file 190 on exit (as described above), whether compression is used for data stored in one or both of the caches 192 and 194, and the like. Other embodiments may specify other options than as described herein in accordance with the functionality included in an embodiment.

It should be noted that in connection with specifying the simulation rate option, in one embodiment, five distinct rates of operation may be specified: immediate, fast, medium, slow, or random. Each of the foregoing rates may be configured or initialized to a particular timing value in I/Os or tracks per second. For example, in one embodiment, the immediate rate is initially set to be the total I/O or tracks per second. In one embodiment, the default rate value may be "slow" or another option which most closely mimics the actual hardware or microcode speed in the embodiment. Other embodiments may specify variations of the foregoing rates of operation. Different rates of operation may be associated by default with different operations in an embodiment.

In one embodiment, the simulator seed file 188 as may be produced, for example, as a debug log file includes information recorded about the various physical devices and connections therebetween, as well as other data storage system state conditions. The simulator seed file 188 in one embodiment may be characterized as a platform independent seed for use in an embodiment of the simulator supporting cross platform simulation. When a simulator seed file 188 is created while executing on a first host having a first configuration of hardware and software, that seed file may be used for simulation on a second host having a second configuration of hardware and software. The first and second configurations may be the same or different. For example, if a simulator seed file 188 is created as a debug log file on a Windows NT, Linux, Sun, HP, or AIX System, that simulator seed file may be used in a subsequent simulation on a target system having the same or different hardware and/or software configuration.

In one embodiment, a variety of different techniques may be used in connection with supporting cross platform simulation. For example, an embodiment of the simulator may support generating a debug log file on a Linux host and using that debug log file as a simulation seed file when executing on a Windows NT host. An embodiment may, for example, identify platform specific elements such as those that may appear in a debug log file. During the parsing phase, those platform specific elements may be isolated and mapped to a generic form. It is this generic form that may be utilized on all platforms internally within the simulator. The generic form may be characterized as common to all of the supported host platforms upon which a simulator may execute. For example, certain characters may not be allowed in device names on a given supported platform. As part of the parsing phase, an embodiment of the simulator may remove any structural and syntax differences for device names such as may be used by a device driver and specified in a low level call, and map such device names to a platform independent name. For example, an embodiment may map another device name "/dev/rdsk/foo1" to "dev_rdsk_foo1". This latter device name may be referenced, for example, in the lower level tables. An embodiment of the simulator may create a file as an object corresponding to devices in connection with simulating different device operations. In connection with determining the name of the file, a name may be formed which is usable on any supported system. The file which corresponds to a simulated device may be used, for example, in connection with simulating device synchronization operations. Synchronization operations on the file (e.g., locking operations) may be used to simulate synchronization operations associated with the device. Other embodiments may use other techniques in connection with simulating different supported operations.

It should be noted that an embodiment may include functionality for reconfiguring any options without restarting the daemon 108 executing as a simulator. For example, one embodiment may include a command interface that may be used to reconfigure one or more options such as the default simulation rate and associated value.

An embodiment may also optionally use as another input (not illustrated in FIG. 5) a data file indicating which data storage system devices or other information included in a simulator seed file 188 should be ignored. This latter input data file may be characterized as an override file identifying modifications or variations from a simulation defined in a simulator seed file 188.

Although the foregoing describes input files that may be used in connection with the daemon executing as a simulator in a second mode, an embodiment may use the same input files when the simulator executes in the first mode also described herein. For example, the input files 182, 184 and 186 may be used in an embodiment independent of whether the daemon is executing as a simulator. Although an input file may be used in either mode, the input file may include an option which may only be applicable when the daemon is executing in one of the two modes. An embodiment may also include an option for use in an input file which is applicable when the daemon is executing in either mode described herein.

Figure 6:
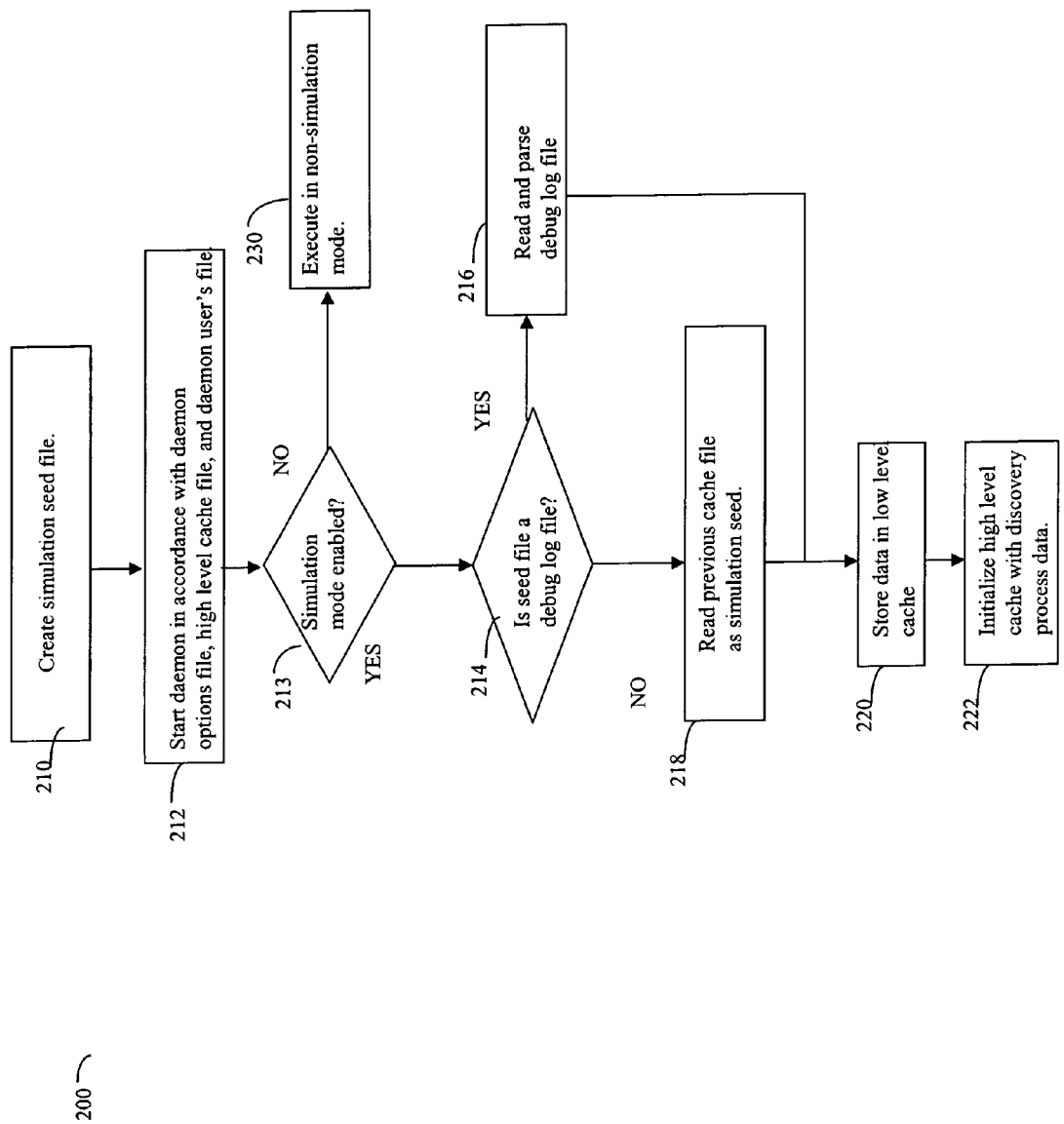
FIG. 6 is a flowchart of processing steps that may be performed in an embodiment in connection with initialization of the daemon as a simulator.

Referring now to FIG. 6, shown is a flowchart 200 of processing steps that may be performed in an embodiment in connection with initialization of the daemon as a simulator. The steps of flowchart 200 summarize those processing steps just described previously in connection with FIG. 5. At step 210, a simulation seed file is created. The simulation seed file is created prior to the start up of the daemon. As described previously, the simulation seed file may be created in any one of a variety of different ways such as described herein. The simulation seed file may be, for example, a debug log file or a dump of a low level cache. At step 212, the daemon is started in accordance with the daemon options file 186, high level cache file 182, daemon user's file 184, and any other inputs that may be included in an embodiment. In order to start the daemon in simulation mode, the daemon options file may include an enabled option causing the daemon to execute in the second or simulation mode described herein. At step 213, a determination is made as to whether the daemon has been enabled to execute in the simulation mode. If not, control proceeds to step 230 to execute in the first non-simulation mode described herein. Otherwise, control proceeds to step 214 where a determination is made as to whether the simulation seed file is a debug log file. If so, processing proceeds to step 216 to read and parse the debug log file. Otherwise, control proceeds to step 218 to read a previous dump file 190 of the low level cache as the simulation seed. At step 220, the simulation seed data may then be stored in the low level cache. Control proceeds to step 222 where the high level cache may be initialized. In one embodiment, the high level cache is initialized with the data returned for a discovery API call associated with the discovery process, described elsewhere herein, as applied to a data storage system. After completing the processing of flowchart 200, an embodiment of the daemon executing as a simulator may continue in accordance with, for example, API calls issued by an executing application. After executing the steps of flowchart 200, the simulator (daemon in simulation mode) is now in execution mode able to process and simulate data storage system configuration calls and commands.

An embodiment may optionally include and use a high level cache 194 as described herein when the daemon executes in a non-simulation mode as well as a simulation mode.

As described herein, an embodiment of the daemon executing as a simulator may include a command interface. Using the command interface, commands may be issued to the daemon during a simulation causing the daemon to perform certain operations at desired simulation points, such as capturing a current simulation state by issuing a command to dump the contents of the low level cache as described herein. The commands may also be used in connection with modifying or setting the simulation state. In an embodiment, the command interface may be used alone or in conjunction with one or more options in the daemon options file to specify simulation conditions. For example, the command interface may be used to specify simulation conditions in accordance with a reported problem to enable reproducing the reported problem. A code developer or maintainer may then attempt to debug and/or test code associated with the reported problem. The simulation conditions that may be specified may include, for example, device state information such as a number of invalid tracks on a device, identifying specific tracks as invalid, and the like. When specifying invalid tracks, an embodiment may include an option to set the invalid track count to a numeric value or based on a percentage of tracks included in a device of a data storage system. Additionally, an embodiment may include an option that may be specified, for example, in the daemon options file which provides for a random generation of an invalid track count in accordance with a percentage of tracks associated with a particular device.

The particular simulation conditions that may be specified may vary in accordance with each embodiment and the particular functionality that may be simulated therein. It should be noted that a particular data storage system configuration may be saved as a seed file, such as a cache dump file, and then reloaded in connection with reproducing a particular data storage system configuration and state. Use of the seed file and the command interface may be used in data storage system configuration for testing purposes.

It should be noted that in connection with processing a simulation seed file, any one of a variety of different parsing techniques may be used known to those of ordinary skill in the art. The debug log file may be in any one of a variety of different formats. In one embodiment, the debug log file may be a text or other file to which the output of the various API calls is directed. The way in which the debug log file is parsed may vary in accordance with the format of the stored output.

Figure 6A:
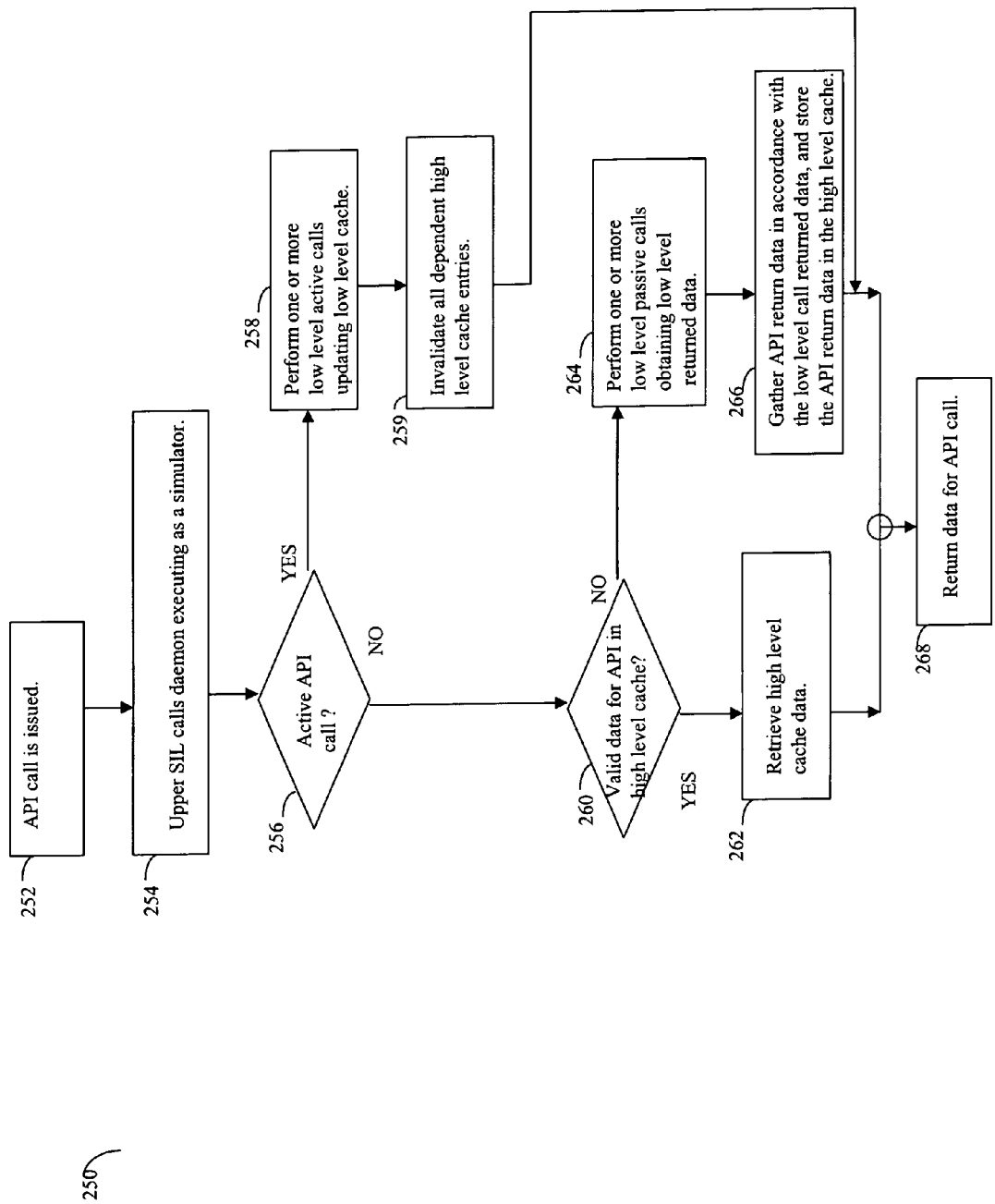
FIG. 6A is a flowchart of processing steps of processing an API (application programming interface) call in an embodiment when the daemon is in simulation mode.

Referring now to FIG. 6A, shown is a flowchart 250 of steps of processing an API call that may be performed in one embodiment when the daemon 108 executes as a simulator. It should be noted that each API call may be characterized as passive, active, or hybrid as described elsewhere herein. An embodiment which includes an API call that may be a hybrid causing both a modification to the low level cache data and also returning data storage system configuration state information may perform processing steps for both the active and passive calls as described in flowchart 250. At step 252, an API call is made, for example, as from an executing application. At step 254, the Upper SIL calls the daemon executing as a simulator. At step 256, the daemon determines whether the API call is an active API call. If so, control proceeds to step 258 where one or more low level calls are issued causing modification of configuration state information stored in the low level cache. At step 259, all high level cache entries dependent on the modified low level cache data are invalidated. The invalidation may be indicated using any one of a variety of different techniques known to those of ordinary skill in the art. For example, one embodiment may include a bit or flag in the header portion of each high level cache entry for each API call. The bit may indicate a value if the corresponding entry is dirty or invalid, and a different value otherwise. Control proceeds to step 268 where data is returned for the API call. In one embodiment in connection with active calls, step 268 returns status information about the active call.

If step 256 determines that the API call is a passive API call, control proceeds to step 260 where a determination is made as to whether valid data is included in the high level cache for the particular API call. If not, control proceeds to step 264 where one or more low level passive calls are performed returning data storage system configuration state information. At step 266, data to be returned for the particular API is determined using the data obtained at step 264. It should be noted that the data returned for a passive API call may include all, or part of, the data obtained at step 264. The data returned for the passive API call may also include information derived from the data obtained at step 264. In other words, the daemon may perform some processing using the data obtained at step 264 to produce derived data. The derived data may be returned for a passive API call. Also at step 266 the passive API call data may be stored in the high level cache. At step 268, the passive API call data is returned. If step 260 determines that there is valid data in the high level cache for a passive API call, control proceeds to step 262 to retrieve the high level cache data which is returned at step 268.

Figure 7:
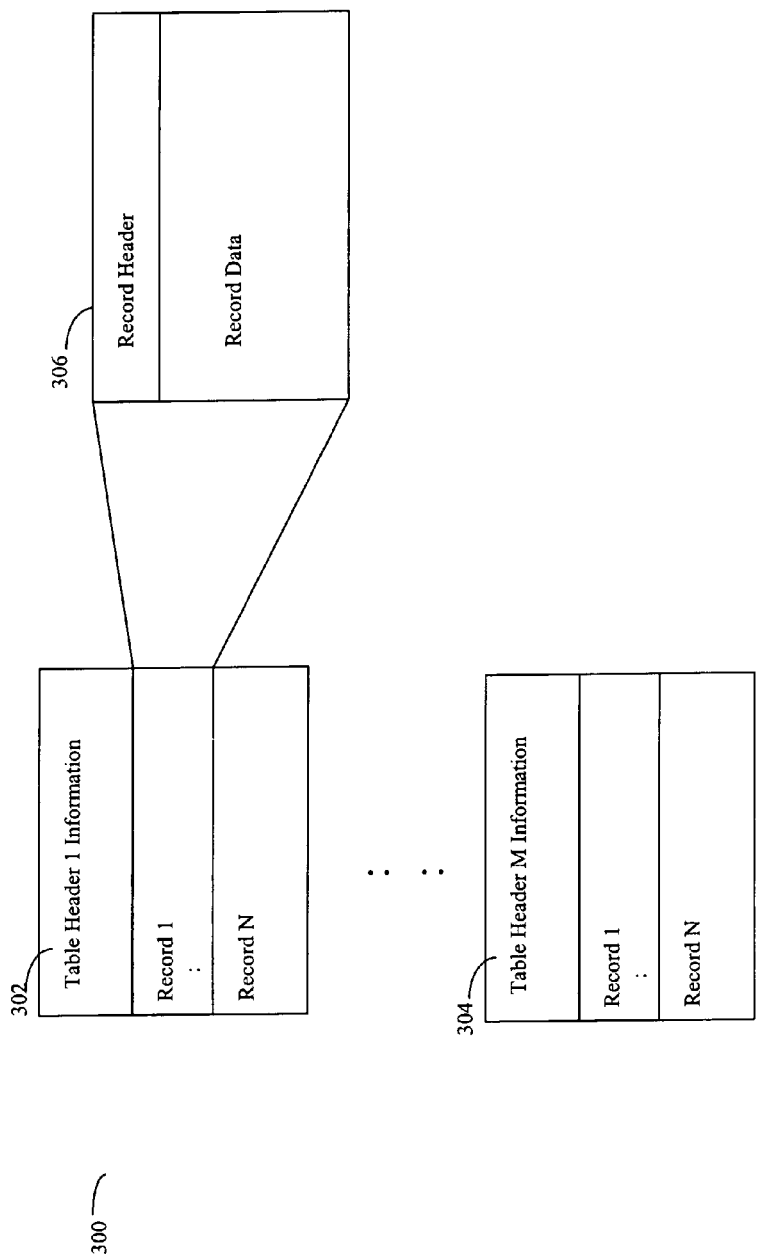
FIG. 7 is a representation of how data used in connection with simulation techniques may be organized in a low level cache.

Referring now to FIG. 7, shown is an example representation 300 of how data used in connection with the simulation techniques described herein may be organized in the low level cache 192 in one embodiment. Included in the example 300 are one or more tables. Each table, such as table 302, includes table header information and one or more records. Each record, such as illustrated by element 306, may include record header information followed by record data. The record data of 306 may be a fixed or variable size depending on the particular table.

In one embodiment, each of the tables included in the representation 300 of the low level cache 192 may be one of three basic categories. Two of the basic table categories are associated with different types of commands issued to a data storage system in non-simulation mode. The command type may be, for example, a vendor specific type of device command. In connection with the first two table categories, an embodiment may use, for example, the SCSI command type to classify the low level passive call information stored for simulated functionality.

A first category of tables includes the data returned by microcode execution on the data storage system in non-simulation mode for read and write buffer commands. For example, in one embodiment described herein using SCSI command requests, the first category of tables may include the data returned by the microcode in response to SCSI 3B/3C vendor-specific write and read buffer command requests, respectively. This is described in more detail in following paragraphs.

A second category of tables may include data characterized as host-based device data. A table in the second category may include data returned in response to microcode execution on the data storage system in non-simulation mode for inquiry and capacity SCSI commands which return data for each device visible to the host.

The third category of tables may include other data used in maintaining simulation state information not stored in the first category of tables as returned from the SCSI 3B/3C vendor-specific write/read buffer commands. Such information may include, for example, data about a particular active low level call such as time information regarding when a simulated action began, a current number of invalid tracks of a device, and the like. The particular information included in each of the tables may vary with embodiment and with operations that are supported by the simulator.

As described elsewhere, the low level cache 192 includes all of the data that may be returned by each low level passive call. As part of simulation start-up, an embodiment may initialize the low level cache in accordance with data that is included in a seed file. During the parsing phase, the first and second categories of tables are initialized. Additionally, some tables included in the third category may also be initialized depending on the particular operations supported by the simulator.

Tables in the first category include the simulation state information which may be retrieved and modified by a low level active call. In one embodiment, the first category of tables includes a table for each data storage system, such as each Symmetrix data storage system or Clarion data storage system as provided by EMC Corporation. In connection with a low level passive call, data may be returned from one or more of the tables associated with one or more of the three categories described herein.

Figure 8:
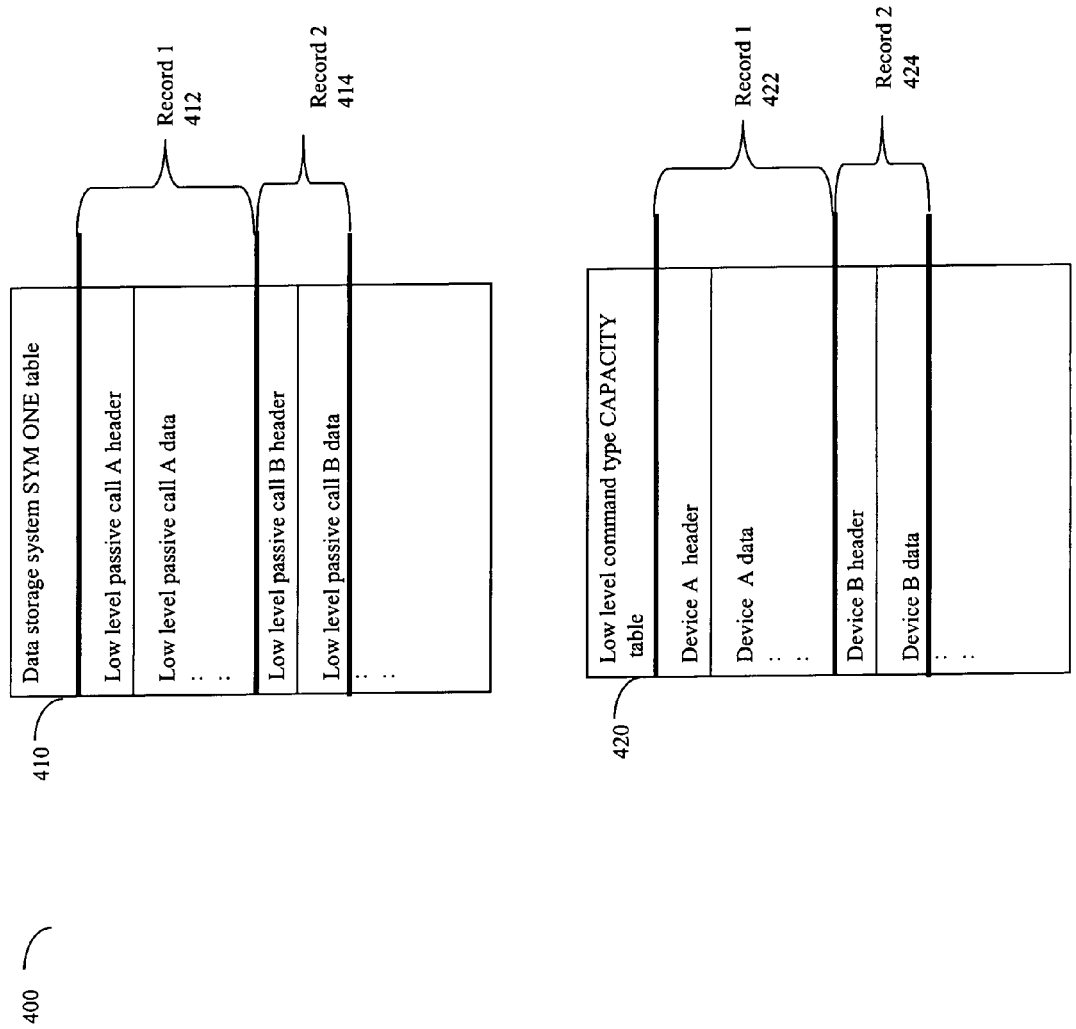
FIG. 8 is an example describing in more detail how a portion of the tables in the low level cache may be organized in an embodiment.

Referring now to FIG. 8, shown is an example 400 describing in more detail how tables of the first and second categories may be organized in one embodiment in a low level cache as used by daemon 108 functioning as a simulator.

Included in the example 400 is a table 410. The table 410 illustrates an organization of a first category table that may exist in a low level cache for each data storage system. The element 410 is a table for the data storage system SYM ONE. Included in the table 410 is a first record 412 and a second record 414. The first record 412 includes header information for a first low level passive call A followed by low level passive call A's return data. Included in the second record 414 is header information for a low level passive call B followed by data associated with the low level passive call B's return data. It should be noted that the records within the tables such as 412 and 414 may be of varying length in accordance with the particular call and the return data associated with that particular low level passive call. Header information associated with each record 412 and 414 may include attributes about the data associated of that particular record. For example, in one embodiment, the header for low level passive call A may include a record key allowing for unique identification of each low level passive call. The key may include, for example, one or more parameters concatenated together to form the key associated with the header. The parameters may be those associated with a request normally issued for that particular low level passive call when the daemon is functioning in a non-simulation mode. The low level passive call parameters used to form the record key may be those included in the command request sent from a device driver, such as the SCSI device driver, to the data storage system in non-simulation mode. The particular record key used may vary in accordance with each embodiment with the amount of information required to uniquely represent an index corresponding to each low level passive call for a data storage system. An embodiment may include a table such as 410 for each data storage system's low level passive call return data.

Table 420 illustrates a second category table organization. One embodiment may include second category tables for storing data returned by the SCSI Inquiry commands (e.g., Inquiry table) and the SCSI Capacity commands (e.g., Capacity table). An embodiment may also include other tables for storing other device information that may be returned by other command types. SCSI Inquiry commands may return information about, for example, device attributes, associated physical devices, and the like. SCSI Capacity commands may return information, for example, about the storage capacity of a device. Tables included in the second category include a record, such as record 422, for every device visible to the host. In one embodiment, these devices are logical devices. The header of each record may include a record key formed using the device name.

In one embodiment, intermediate or temporary tables of the third category may be created and used during the parsing phase as data is input, for example, from the seed file. Data from these intermediate tables may be used to produce one or more other resultant tables. For example, an embodiment may build one or more temporary tables during the parsing phase in connection with determining the topology for the one or more data storage systems. The topology may include, for example, determining local and remote data storage systems, connections between data storage systems and hosts, and the like. The resultant tables may be used during the execution phase when commands are simulated. The format of these tables may vary in accordance with usage.

Figure 9:
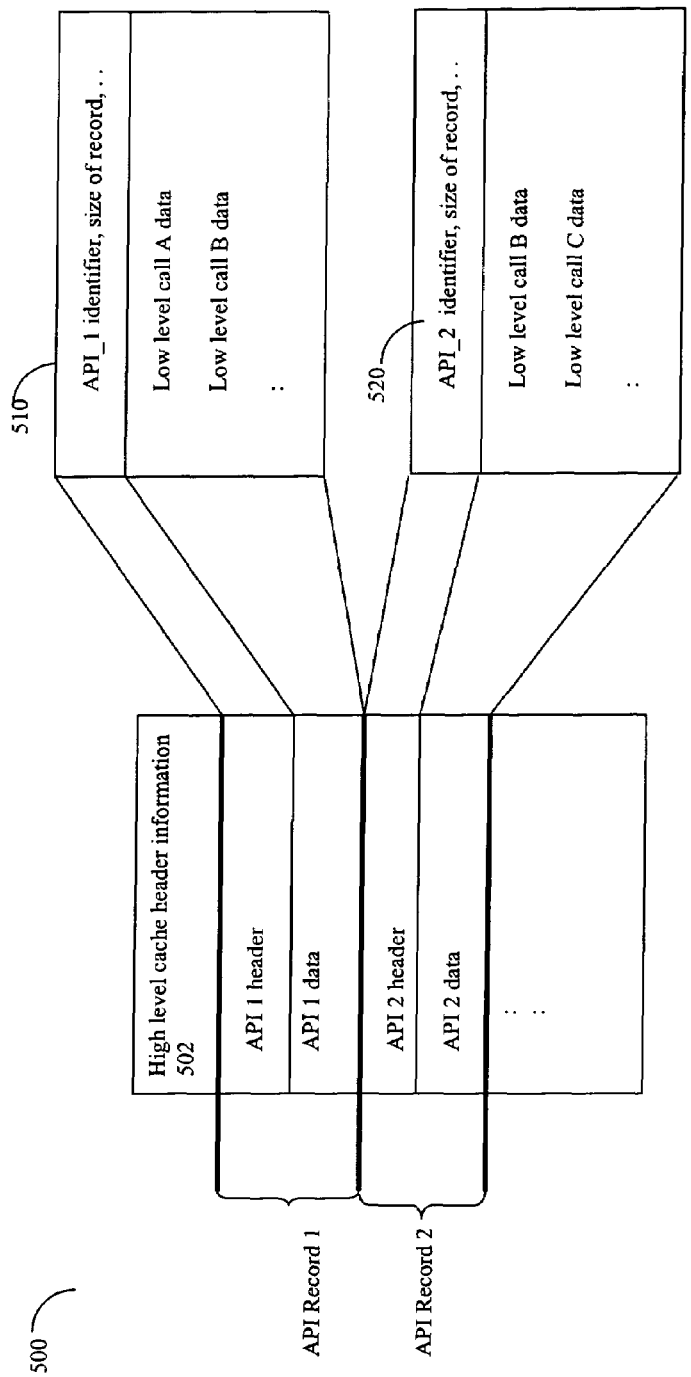
FIG. 9 is an example representation of a high level cache organization that may be included in an embodiment.

Referring now to FIG. 9, shown is an example representation 500 of a high level cache organization that may be included an embodiment. The high level cache organization includes a cache header 502 followed by one or more records each corresponding to an API call. The cache header 502 may include information about the current high level cache such as, for example, the number of records or size of the cache, timestamp information, and the like. In this example 500, a first API record 510 includes information returned for a first API call, API_1. The header portion of 510 includes a unique key to associate the record 510 with API_1. The header portion of record 510 may include other information such as, for example, the size of the following data portion of record 510, flags such as may be used to indicate an invalid cache record, and the like. The data portion of record 510 may include return information from one or more low level passive calls. The data portion of 510 may also include data produced using the return information. In this example, 510 includes data returned from a low level passive call A and a low level passive call B. Record 520 includes the data to be returned in connection with API_2. The data portion of 520 includes data returned from low level passive calls B and C. When an API call is made, it is determined if a valid corresponding record exists in the high level cache arrangement 500. If so, the data portion of the corresponding record is returned. Otherwise, one or more low level passive calls are made through the lower SIL to simulated functions 160 when the daemon is operating in simulation mode. It should be noted that the operation and management of the high level cache in an embodiment may be the same in both simulation and non-simulation mode of the daemon. The lower SIL may communicate with the simulated functions 160 when in simulation mode as illustrated, for example, in FIG. 4. Otherwise, the lower SIL may communicate with the device driver routines as illustrated, for example, in FIG. 3.

A low level active call may have an effect on results returned by one or more low level passive calls. When a low level active call is received by the simulated functions 160, one or more dependent low level passive calls are determined. The data is then read from the low level cache, modified, and then written back out to the low level cache to the appropriate low level passive call records included in the cache tables. The foregoing modification of the low level passive call return information represents the simulation run time state of a data storage configuration in accordance with the low level active calls issued up to a particular point in time in the simulation.

It should be noted that the high level and low level caches described herein, or selected portions thereof, may be stored in memory and/or on a disk or other storage device.

In one embodiment, multiple levels of enablement may be required in order for the daemon to execute in simulation mode. For example, an embodiment may require that multiple options be enabled in the daemon options file to enable the simulator. Use of multiple options may be desirable in order to prevent the daemon from executing in a different mode than what a user actually expects.

When executing in non-simulation mode, an API call may result in one or more low level calls and one or more SCSI based commands being issued. In this embodiment described herein, active and passive API calls may result in the issuance of, for example, a capacity or inquiry SCSI command, or both SCSI 3B and 3C commands for executing active and passive low level calls. Each SCSI command may correspond to a low level call made to either the simulated functions module when in simulation mode, or the device driver when in non-simulation mode.

When in non-simulation mode, for a passive low level call, a SCSI 3B command may be sent to the data storage system with the appropriate identifiers indicating a passive call. Subsequently, a SCSI 3C command may be sent to the data storage system. The 3C command causes execution of the previous corresponding 3B command, and result in sending a response back to the daemon with the passive call return information. For an active low level call, a SCSI 3B command may be sent to the data storage system with the modification to be made to the appropriate configuration data included as part of the 3B command payload or data portion. Subsequently, a SCSI 3C command may be sent causing execution of the previous corresponding SCSI 3B command. The pairing of 3B and 3C commands may be made by the data storage system receiving these commands by including a unique pairing identifier in the header of each 3B/3C SCSI command. The data storage system may use this unique pairing identifier to appropriately match received SCSI 3B and 3C commands.

When executing in simulation mode, the first category tables in the low level cache include records of 3C data as may be returned after execution of a 3C command associated with a low level passive call. What will now be described is processing that may be performed by an embodiment of the daemon when executing in simulation mode for a passive low level call using both 3B and 3C commands. The simulated functions module receives a 3B SCSI command indicating a passive low level call causing a temporary entry in a category three table to be created for a target data storage system. Subsequently, a low level call for a corresponding 3C command is received by the simulated functions module. The temporary entry including the corresponding passive 3B command information is determined for the received 3C command. Data is then retrieved from the first category tables in accordance with the target data storage system and stored in the temporary entry. The temporary entry may be further modified in accordance with the retrieved information, for example, to reflect the total amount of data in the temporary entry. The completed temporary entry is returned to the lower SIL.

What will now be described is processing that may be performed by an embodiment of the daemon when executing in simulation mode for an active low level call using both 3B and 3C commands. The simulated functions module receives a 3B SCSI command indicating an active low level call causing a temporary entry in a category three table to be created for a target data storage system. One or more inputs are specified with the 3B command and stored in the temporary entry. The inputs indicate the configuration data modification to be made to one or more records of data included in one or more category one tables of the low level cache. Additionally, execution of an active low level call may also cause other simulator state information to be modified, for example, in other third category tables. After the low level cache data is modified in accordance with the active low level call inputs, control is returned to the lower SIL.

The foregoing describes techniques that may be used in connection with data storage system configuration simulation which may be used alone, or in combination with, other simulation functionality, such as, for example, simulation of the data of the data storage system (e.g., effects of read and write operations on the data stored in the data storage system).

The simulation of the data storage system configuration may be used, for example, in testing an application executing on a host without requiring any data storage system hardware and software. The techniques may be used to test an application with different data storage system hardware and/or software versions without the actual data storage system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for simulating a configuration of a data storage system comprising:
   receiving first configuration data representing an initial data storage system configuration state;
   storing said first configuration data;
   providing an execution mode for processing configuration calls;
   receiving a configuration call for the data storage system;
   when said execution mode is configured to a non-simulation mode, communicating with the data storage system to perform processing for said configuration call; and
   when said execution mode is configured to a simulation mode, simulating said configuration call to the data storage system by simulating one or more calls to the data storage system using said first configuration data in accordance with a type of said configuration call, wherein said simulating is performed without communicating with the data storage system, wherein if said type is active, said configuration call results in modifying a portion of said first configuration data to simulate modifying the initial data storage system configuration state and storing said portion that has been modified, and wherein if said type is passive, said configuration call results in returning data associated with a portion of said first configuration data without modification to said first configuration data to simulate returning information about the initial data storage system configuration state without modification thereto.

2. The method of claim 1, wherein when said execution mode is configured to said simulation mode, said type of said configuration call is hybrid if said configuration call results in both modifying a portion of said first configuration data and returning data associated with a portion of said first configuration data.

3. The method of claim 1, wherein said first configuration data includes data describing a topology of said data storage system.

4. The method of claim 1, wherein said first configuration data includes data describing data storage devices, connections between said data storage devices, connections between data storage devices and host systems.

5. The method of claim 1, further comprising:
   determining said first configuration data in accordance with a simulation initialization input.

6. The method of claim 5, wherein said simulation initialization input includes a file with output produced by one or more application programming interface calls returning data storage system configuration state information.

7. The method of claim 6, wherein said simulation initialization input includes at least one value specifying a simulation condition included in an options file.

8. The method of claim 1, further comprising:
   modifying said first configuration data using a command line interface.

9. The method of claim 1, wherein said first configuration data is included in a cache, and the method further comprising:
   storing contents of said cache to a dump file; and
   using said dump file in initializing a simulation.

10. The method of claim 5, further comprising:
    initializing a cache in accordance with said simulation initialization input.

11. The method of claim 10, wherein said configuration call is a high level call resulting in one or more low level calls, said one or more low level calls resulting in communications with a data storage system when executing in said non-simulation mode, and otherwise resulting in said one or more low level calls being simulated when executed during a simulation in said simulation mode.

12. The method of claim 11, wherein, during said simulation, said low level calls use data included in a low level cache, said data in said low level cache corresponding to data returned by microcode execution on the data storage system for each low level call, said first configuration data including said data in said low level cache.

13. The method of claim 12, wherein a portion of said data in said low level cache is modified in accordance with said type if said configuration call is active, and returning data associated with a portion of said data in said low level cache if said configuration call is passive.

14. The method of claim 13, wherein a high level cache is used to cache data returned for passive configuration calls, said high level cache including an entry for at least one passive configuration call associated with a portion of data returned from at least one low level call.

15. The method of claim 14, wherein said high level cache is used independent of whether a simulation is in progress.

16. The method of claim 1, wherein said first configuration data does not reflect a state of user data stored on devices within the data storage system in accordance with commands that modify the user data stored on the devices.

17. The method of claim 6, wherein an executable program performs said one or more application programming interface calls.

18. A computer readable medium comprising code stored thereon that when executed simulates a configuration of a data storage system, the computer readable medium comprising code that:
   receives first configuration data representing an initial data storage system configuration state;
   stores said first configuration data;
   provides an execution mode for processing configuration calls;
   receives a configuration call for the data storage system;
   when said execution mode is configured to a non-simulation mode, communicates with the data storage system to perform processing for said configuration call; and
   when said execution mode is configured to a simulation mode, simulates said configuration call to the data storage system by simulating one or more calls to the data storage system using said first configuration data in accordance with a type of said configuration call, wherein said simulating is performed without communicating with the data storage system, wherein if said type is active, said configuration call results in modifying a portion of said first configuration data to simulate modifying the initial data storage system configuration state and storing said portion that has been modified, and wherein if said type is passive, said configuration call results in returning data associated with a portion of said first configuration data without modification to said first configuration data to simulate returning information about the initial data storage system configuration state without modification thereto.

19. The computer readable medium of claim 18, wherein, when said execution mode is configured to said simulation mode, said type of said configuration call is hybrid if said configuration call results in both modifying a portion of said first configuration data and returning data associated with a portion of said first configuration data.

20. The computer readable medium of claim 18, wherein said first configuration data includes data describing a topology of said data storage system.

21. The computer readable medium of claim 18, wherein said first configuration data includes data describing data storage devices, connections between said data storage devices, connections between data storage devices and host systems.

22. The computer readable medium of claim 18, further comprising code that:
   determines said first configuration data in accordance with a simulation initialization input.

23. The computer readable medium of claim 22, wherein said simulation initialization input includes a file with output produced by one or more application programming interface calls returning data storage system configuration state information.

24. The computer readable medium of claim 23, wherein said simulation initialization input includes at least one value specifying a simulation condition included in an options file.

25. The computer readable medium of claim 18, further comprising code that:
   modifies said first configuration data using a command line interface.

26. The computer readable medium of claim 18, wherein said first configuration data is included in a cache, and the computer program product further comprising code that:
   stores contents of said cache to a dump file; and
   uses said dump file in initializing a simulation.

27. The computer readable medium of claim 22, further comprising code that:
   initializes a cache in accordance with said simulation initialization input.

28. The computer readable medium of claim 27, wherein said configuration call is a high level call resulting in one or more low level calls, said one or more low level calls resulting in communications with a data storage system when executing in said non-simulation mode, and otherwise resulting in said one or more low level calls being simulated when executed during a simulation in said simulation mode.

29. The computer readable medium of claim 28, wherein, during said simulation, said low level calls use data included in a low level cache, said data in said low level cache corresponding to data returned by microcode execution on the data storage system for each low level call, said first configuration data including said data in said low level cache.

30. The computer readable medium of claim 29, wherein a portion of said data in said low level cache is modified in accordance with said type if said configuration call is active, and returning data associated with a portion of said data in said low level cache if said configuration call is passive.

31. The computer readable medium of claim 30, wherein a high level cache is used to cache data returned for passive configuration calls, said high level cache including an entry for at least one passive configuration call associated with a portion of data returned from at least one low level call.

32. The computer readable medium of claim 31, wherein said high level cache is used independent of whether a simulation is in progress.

33. The computer readable medium of claim 18, wherein said first configuration data does not reflect a state of user data stored on devices within the data storage system in accordance with commands that modify the user data stored on the devices.

34. The computer readable medium of claim 23, wherein an executable program performs said one or more application programming interface calls.

* * * * *